(No Model.)
G. W. POND.
BICYCLE CHAIN CONNECTION.
No. 600,595. Patented Mar. 15, 1898.
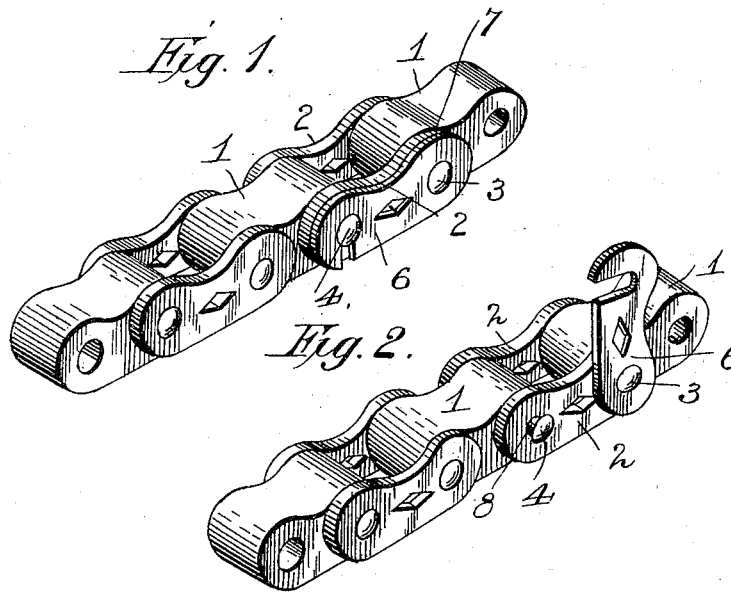
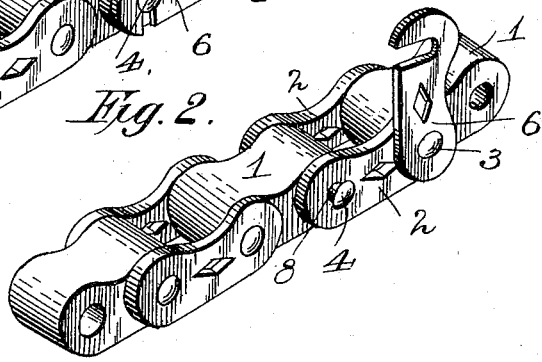
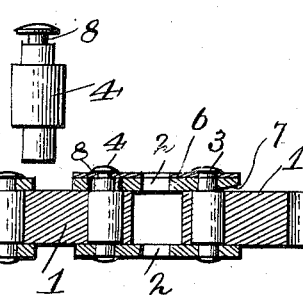
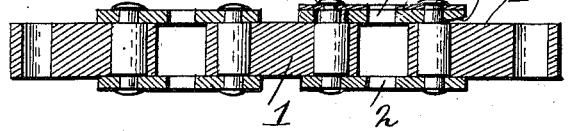
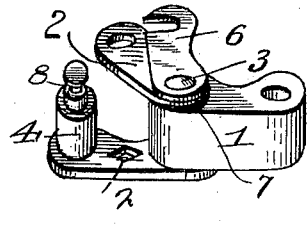
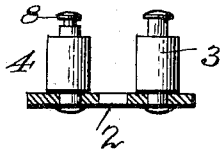
Witnesses:
Franck L. Ourand
Jo. L. Coombs
Inventor:
George W. Pond,
by Simis Bagger & Co.
Attorneys.

UNITED STATES PATENT OFFICE.

GEORGE WHITLOCK POND, OF CLEVELAND, OHIO.

BICYCLE-CHAIN CONNECTION.

SPECIFICATION forming part of Letters Patent No. 600,595, dated March 15, 1898.

Application filed November 8, 1897. Serial No. 657,827. (No model.)

*To all whom it may concern:*

Be it known that I, GEORGE WHITLOCK POND, a citizen of the United States, and a resident of Cleveland, in the county of Cuyahoga and State of Ohio, have invented certain new and useful Improvements in Bicycle-Chain Connections; and I do hereby declare that the following is a full, clear, and exact description of the invention, which will enable others skilled in the art to which it appertains to make and use the same, reference being had to the accompanying drawings, which form a part of this specification.

My invention relates to means for connecting together the ends of chains, and is more especially designed for use in connection with the endless sprocket-chains for propelling bicycles.

The object of the invention is to provide an improved connection for chains by means of which the ends can be easily and readily connected with each other and the connection be locked, so as to obviate all liability of being accidentally disconnected or of any part of connection being lost.

The invention consists in the combination, with two chain center links, of the connecting device comprising two side bars, one of which is pivotally connected at each end with said center links by pivots or pins, one of which pins or pivots is provided with a head or shoulder at one end, preferably formed by a groove or slot turned around and in said pivot near its outer end, and a locking-hook pivoted to the other pin and adapted to engage with said grooved head or shoulder, thus locking the side bar firmly and making the complete link, as hereinafter fully described and claimed.

In the accompanying drawings, Figure 1 is a perspective view showing the end center link of the bicycle or other chain connected together by my improved connections, thus forming an endless chain as used. Fig. 2 is a similar view, the pivoted lock-hook being disconnected from the groove or slot or head on pivot or pin by being swung around, also the side bar being swung around, as when ready to disconnect chain. Fig. 3 is an elevation, on an enlarged scale, of the headed or grooved or slotted pivot or pin into which the lock-hook engages. Fig. 4 is a similar view showing a modified construction, showing plainly peripheral groove in the pivot. Fig. 5 shows one side bar, into which one end of each pivot is firmly riveted before the center link and its corresponding side bar with the lock is put on. Fig. 6 is a detail view.

In the said drawings, the reference-numeral 1 designates the end center links of a bicycle or other chain of any ordinary or suitable construction.

The numeral 2 designates two side bars pivotally connected at the ends with the said center links by pivots or pins 3 and 4, loosely passing through holes in said center links, so as to allow free movement of said links on the pivots. These pivots or pins are firmly riveted into one of the side bars at the respective ends of same, as in Fig. 5, and the other ends extend through and slightly beyond the other side bar, and upon pivot 3 the said side bar turns loosely, and to one of said pins 3 is pivoted outside of said side bar a lock-hook 6, preferably of spring-steel, which is held in place thereon outside of and parallel with and against the side bar by upsetting the end of the pin, forming a head thereon. The other pivot or pin 4 is formed with a head or shoulder 8, between which and the side bar 2 at that side the free end of the hook engages. This head or shoulder is formed by upsetting the end of the pivot or pin or by turning down, leaving a head thereon, and the holes in that side bar and center link are large enough to allow it to pass readily therethrough, or preferably a peripheral groove is cut in said pivot, as shown at 9 in Fig. 4.

In practice the pin 4 is passed through the open end of center link 1 to chain. The side bar is then slipped on over the end of pivot and tightly rests against the side of said center link or to the shoulder on the pivot 4, and the "lock-hook" then turned so as to engage in the groove or with the head or shoulder of the pin, which will be thereby locked and prevented from accidental disengagement. To disconnect the chain, the hook is disengaged from the pin and the side bar lifted over the end of pivot or pin and swung around, allowing the center link to be slipped off from pivot.

As seen in Fig. 2, the side bar 2, which is detachably connected with the pivot 4, is cut away at the end connected with said pivot, forming a beveled portion 7, which allows said bar to be tilted so as to be engaged with and disengaged from the pivot 4.

The advantages of my invention will be apparent.

First. The chain can be readily disconnected for cleaning and other purposes and then connected again without the use of any special tools.

Second. There will be no danger of losing any parts, as they are all fixed.

Third. The device can be applied to any and all descriptions of similar chain and will in no manner interfere with the working thereof.

Fourth. The chain can be used with an ordinary sprocket and be changed to a high or low gear by adding or removing links to or from the chain, as the case may be, to fit the size sprocket-wheel used.

Fifth. There is no loose bolt to wear or cut out sprocket-wheels, nor nut to lose off.

Sixth. It is absolutely dust and sand proof.

Seventh. It is invisible from the outside of chain on wheel.

Eighth. As used in endless chains the centrifugal force tends to keep the lock-hook securely in its place, and if it should get loosened by wear it cannot unhook itself.

Having thus fully described my invention, what I claim is—

In a sprocket-chain, the combination with the center links, of the side bar having a pin at one end permanently secured thereto and formed with a head or shoulder and a pivot-pin at the other end also permanently secured thereto, the opposite side bar through which said pins pass pivotally connected with said pivot-pin and having its pivoted end beveled or cut away so that it can be tilted so as to disengage it from the headed or shouldered pin, and the locking-hook of spring metal pivotally connected with said pivot-pin and permanently connected therewith, substantially as described.

In testimony that I claim the foregoing as my own I have hereunto affixed my signature in presence of two witnesses.

GEORGE WHITLOCK POND.

Witnesses:
JUSTIN A. TYLER,
WM. WAYNE CHASE.